US009011340B2

(12) United States Patent
Tal

(10) Patent No.: US 9,011,340 B2
(45) **Date of Patent: *Apr. 21, 2015**

(54) ENHANCED ULTRASOUND IMAGE DISPLAY

(75) Inventor: Roy Tal, Haifa (IL)

(73) Assignee: Biosense Webster, Inc., Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,277

(22) Filed: Nov. 10, 2011

(65) Prior Publication Data

US 2012/0053452 A1 Mar. 1, 2012

Related U.S. Application Data

(63) Continuation of application No. 11/417,766, filed on May 3, 2006, now Pat. No. 8,075,486.

(51) Int. Cl.

| | |
|---|---|
| ***A61B 8/00*** | (2006.01) |
| ***A61B 5/04*** | (2006.01) |
| ***G06T 7/00*** | (2006.01) |

(52) U.S. Cl.

CPC ............. *G06T 7/0026* (2013.01); *G06T 7/0042* (2013.01); *G06T 2207/30048* (2013.01)

(58) Field of Classification Search

CPC ................ A61B 8/0883; A61B 6/503; A61B 2017/00053; A61B 2017/00243; A61B 2019/5276

USPC .......... 382/128, 130–133, 257, 285; 600/424, 600/408, 300, 407, 437–461; 424/9.4; 345/418, 419; 601/2–4; 604/19, 20; 73/310

See application file for complete search history.

(56) References Cited

U.S. PATENT DOCUMENTS

| | | | | |
|---|---|---|---|---|
| 6,066,096 | A | 5/2000 | Smith et al. | |
| 6,332,089 | B1 | 12/2001 | Acker et al. | |
| 6,490,474 | B1 | 12/2002 | Willis et al. | |
| 6,556,695 | B1 * | 4/2003 | Packer et al. | 382/128 |
| 6,618,612 | B1 | 9/2003 | Acker et al. | |
| 6,645,145 | B1 | 11/2003 | Dreschel et al. | |
| 6,650,927 | B1 | 11/2003 | Keidar | |
| 6,690,963 | B2 | 2/2004 | Ben-Haim et al. | |

(Continued)

FOREIGN PATENT DOCUMENTS

| | | |
|---|---|---|
| JP | 9-322893 | 12/1997 |
| JP | 2002-113004 | 4/2002 |
| JP | 2004-160221 | 6/2004 |

OTHER PUBLICATIONS

U.S. Official Action dated Dec. 24, 2008 from related U.S. Appl. No. 11/417,766.

U.S. Official Action dated Jul. 22, 2009 from related U.S. Appl. No. 11/417,766.

(Continued)

*Primary Examiner* — Elmer Chao

(57) ABSTRACT

Using specialized cardiac catheters for image acquisition, features of the heart are readily identifiable on an ultrasound image, based on a previously generated electrical activation map of the heart. The electrical activation map is automatically registered with the ultrasound image using information obtained from position sensors in the catheters. Features identifiable on the electrical activation map, presented as points, tags, design lines, and textual identification, are projected into the plane of the ultrasound fan and overlaid on the ultrasound image, thereby clarifying the features that are visible on the latter.

4 Claims, 5 Drawing Sheets

DISPLAY LIST OF CHAMBERS — 76
SELECT CHAMBERS AND COLORS — 78
COMPUTE CHAMBER INTERSECTIONS WITH ULTRASOUND IMAGE — 80
DISPLAY OVERLAY — 82
ADD TEXT LABELS — 86
END — 88

(56) References Cited

U.S. PATENT DOCUMENTS

| | | | | |
|---|---|---|---|---|
| 6,716,166 | B2 | 4/2004 | Govari | |
| 6,719,700 | B1 * | 4/2004 | Willis | 600/462 |
| 6,773,402 | B2 | 8/2004 | Govari et al. | |
| 6,788,967 | B2 | 9/2004 | Ben-Haim et al. | |
| 6,892,091 | B1 | 5/2005 | Ben-Haim et al. | |
| 7,604,601 | B2 | 10/2009 | Altmann et al. | |
| 7,831,076 | B2 * | 11/2010 | Altmann et al. | 382/128 |
| 7,996,060 | B2 * | 8/2011 | Trofimov et al. | 600/424 |
| 8,075,486 | B2 * | 12/2011 | Tal | 600/443 |
| 2002/0143367 | A1 * | 10/2002 | Levine et al. | 607/9 |
| 2004/0068178 | A1 | 4/2004 | Govari | |
| 2004/0147920 | A1 | 7/2004 | Keidar | |
| 2006/0036167 | A1 | 2/2006 | Shina | |

OTHER PUBLICATIONS

U.S. Official Action dated Feb. 8, 2010 from related U.S. Appl. No. 11/417,766.

U.S. Official Action dated Jul. 22, 2010 from related U.S. Appl. No. 11/417,766.

U.S. Official Action dated Jan. 21, 2011 from related U.S. Appl. No. 11/417,766.

Lisa Gottesfeld Brown, A survey of image registration techniques (abstract), ACM Computing Surveys (CSUR) archive, vol. 24 , Issue 4, Dec. 1992), pp. 325-376 ( http://portal.acm.org/citation.cfm?id=146374 ).

Notification of Reasons for Refusal dated Sep. 18, 2012 received from the Japanese Patent Office from related Japanese Application No. 2007-121658, together with an English-language translation.

* cited by examiner 98
100
OVERLAY ALGORITHM
102
CARTO 3D SPACE
90
92
CARTO ELECTRO-ANATOMICAL MAPS
94
CT / MRI IMAGES (REGISTERED TO CARTO 3D SPACE)
96
ULTRASOUND CONTOURS (AUTOMATICALLY REGISTERED TO CARTO 3D SPACE)

ENHANCED ULTRASOUND IMAGE DISPLAY

CROSS REFERENCE TO RELATED APPLICATION

The present application is a continuation application of U.S. patent application Ser. No. 11/417,766 filed on May 3, 2006, the entire contents of which are incorporated herein by reference.

BACKGROUND OF THE INVENTION

1. Field of the Invention

This invention relates to medical imaging. More particularly, this invention relates to improvements in the identification of topologic features in cardiac ultrasound images.

2. Description of the Related Art

Ultrasound imaging is now well established as a modality for imaging the heart. For example, U.S. Pat. No. 6,066,096, whose disclosure is incorporated herein by reference, describes an imaging probe for volumetric intraluminal ultrasound imaging. The probe, configured to be placed inside a patient's body, includes an elongated body having proximal and distal ends. An ultrasonic transducer phased array is connected to and positioned on the distal end of the elongated body. The ultrasonic transducer phased array is positioned to emit and receive ultrasonic energy for volumetric forward scanning from the distal end of the elongated body. The ultrasonic transducer phased array includes a plurality of sites occupied by ultrasonic transducer elements.

However, many physicians find it difficult to interpret ultrasound images, which typically appear as a two-dimensional fan-shaped pattern. Although the physician knows what anatomical features should appear in a display produced by an ultrasound catheter, he may not be able to match these features with the bright and dark areas of the fan.

It has been proposed to improve medical image interpretation by superimposing images acquired by different modalities in registration. For example, U.S. Pat. No. 6,556,695, issued to Packer et al., suggests that a magnetic resonance image can be acquired, and then registered with a subsequently acquired electrical activation map or ultrasound image.

SUMMARY OF THE INVENTION

According to disclosed embodiments of the invention, using specialized cardiac catheters for image acquisition, features of the heart are readily identifiable on an ultrasound image, based on a previously generated electrical activation map of the heart. The electrical activation map is automatically registered with the ultrasound image using information obtained from position sensors in the catheters. Features identifiable on the electrical activation map, presented as points, tags, design lines, and textual feature identification, are projected into the plane of the ultrasound fan, overlaid on the ultrasound image, and used as references that enable other topologic features to be identified on the ultrasound image. The techniques according to the disclosed embodiments of the present invention enhance the diagnostic usefulness of the ultrasound catheter and make it more accessible to physicians who are not experts in ultrasound imaging.

An embodiment of the invention provides a computer-assisted method for producing images of a heart in a living subject, which is carried out by introducing at least one probe into the heart. The probe has a location sensor for determining respective spatial coordinates of different locations in the heart to define a three-dimensional space. The method is further carried out by acquiring a reference image of the heart, correlating points on the reference image with corresponding points in the three-dimensional space to define reference spatial coordinates of the reference image, acquiring a gated ultrasound image of the heart, registering the ultrasound image with the three-dimensional space, and automatically identifying features on the ultrasound image by correlating the reference spatial coordinates with corresponding coordinates of the ultrasound image.

According to one aspect of the method, the reference image can be an electro-anatomic map, a three-dimensional ultrasound image, a magnetic resonance image, or a computed tomographic image.

According to another aspect of the method, the ultrasound image is a two-dimensional ultrasound image.

In yet another aspect of the method, identifying features on the ultrasound image includes applying respective visual indicators to the features. The visual indicators can be textual indicia or graphics.

An embodiment of the invention provides a computer-assisted method for producing images of a heart in a living subject, which is carried out by introducing at least one probe into the heart, the probe having a location sensor. Using the probe, the method is further carried out by measuring electrical signals passing through the heart at different locations in the heart, and determining respective spatial coordinates of the locations. The method is further carried out by generating an electrical activation map of the heart responsively to the electrical signals, acquiring an ultrasound image of the heart, registering the electrical activation map with the ultrasound image, and automatically identifying anatomic structures on the ultrasound image by correlating spatial map coordinates on the registered electrical map with spatial image coordinates on the ultrasound image.

In one aspect of the method, measuring electrical signals and acquiring an ultrasound image are performed with exactly one probe. Alternatively, measuring electrical signals is conducted with a first probe and acquiring an ultrasound image is performed with a second probe.

An embodiment of the invention provides an imaging system for producing images of a heart in a living subject, including at least one elongate probe adapted for insertion into the heart, the probe having a location sensor, at least one acoustic transducer operative for emitting and receiving acoustic waves while the probe is in the heart, and an electrical sensor for sensing electrical signals passing through the heart. The system includes a positioning subsystem for determining position coordinates of the probe in the heart responsively to location signals received from the location sensor, first control circuitry for processing the electrical signals to generate an electrical map of the heart, for identifying features thereon and for defining respective first positions of the features cooperatively with the positioning subsystem, and second control circuitry for analyzing signals from the acoustic transducer to construct an acoustic image of the heart and to define second positions on the acoustic image cooperatively with the positioning subsystem. The system includes a monitor operative for displaying the acoustic image, and image processing circuitry operative for registering the electrical map with the acoustic image. The image processing circuitry is operative for identifying anatomic structures of the heart on the displayed acoustic image on the monitor by correlating the features on the registered electrical map with the second positions on the acoustic image.

According to an additional aspect of the invention, the imaging system comprises a first probe and a second probe, wherein the first probe has the location sensor and the second probe has the at least one acoustic transducer.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

System Overview

Figure 1:
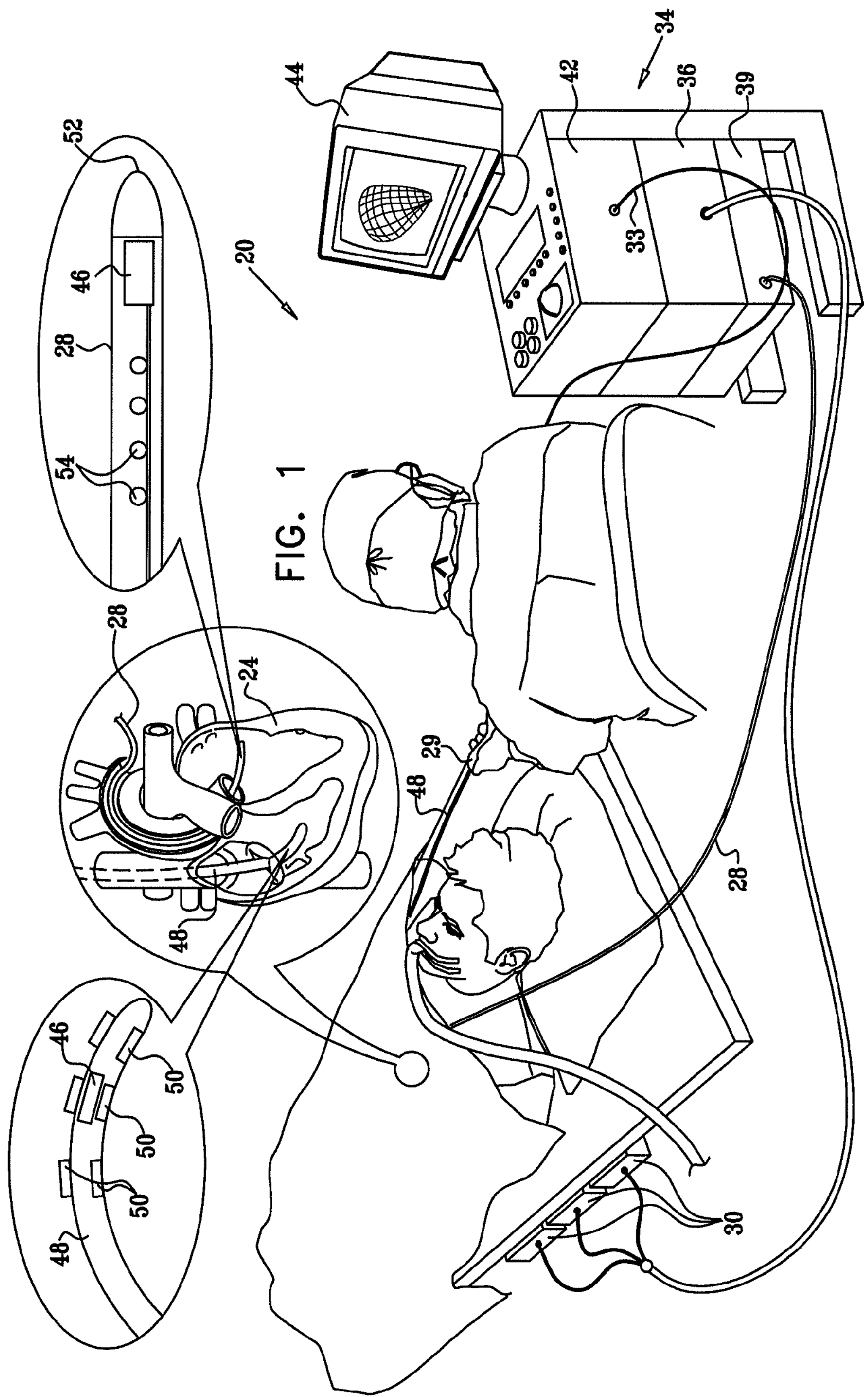
FIG. 1 illustrates a system for imaging and mapping a heart of a patient in accordance with disclosed embodiment of the invention.

Turning now to the drawings, reference is initially made to FIG. 1, which is an illustration of a system 20 for imaging and generating electrical activation maps of a heart 24 of a patient, and which is suitable for performing diagnostic or therapeutic procedures involving the heart 24, in accordance with an embodiment of the present invention. The system comprises a catheter 28, which is percutaneously inserted by a physician into a chamber or vascular structure of the heart. The catheter 28 typically comprises a handle 29 for operation of the catheter by the physician. Suitable controls on the handle 29 enable the physician to steer, position and orient the distal end of the catheter as desired.

The system 20 comprises a positioning subsystem that measures three-dimensional location information and orientation coordinates of the catheter 28 with up to six degrees of freedom. Throughout this patent application, the term "location" refers to the spatial coordinates of the catheter, and the term "orientation" refers to its angular coordinates. The term "position" refers to the full positional information of the catheter, comprising both location and orientation coordinates.

In one embodiment, the positioning subsystem comprises a magnetic position tracking system that determines the position and orientation of the catheter 28. The positioning subsystem generates magnetic fields in a predefined working volume its vicinity and senses these fields at the catheter. The positioning subsystem typically comprises a set of external radiators, such as field generating coils 30, which are located in fixed, known positions external to the patient. The coils 30 generate fields, typically electromagnetic fields, in the vicinity of the heart 24.

In an alternative embodiment, a radiator in the catheter, such as a coil, generates electromagnetic fields, which are received by sensors (not shown) outside the patient's body.

The position sensor transmits, in response to the sensed fields, position-related electrical signals over cables 33 running through the catheter to a console 34. Alternatively, the position sensor may transmit signals to the console 34 over a wireless link. The console 34 comprises a positioning processor 36 that calculates the location and orientation of the catheter 28 based on the signals sent by a location sensor 46. The positioning processor 36 typically receives, amplifies, filters, digitizes, and otherwise processes signals from the catheter 28. Images produced by the system 20 are displayed on a monitor 44.

Some position tracking systems that may be used for this purpose are described, for example, in U.S. Pat. Nos. 6,690,963, 6,618,612 and 6,332,089, and U.S. Patent Application Publications 2004/0147920, and 2004/0068178, whose disclosures are incorporated herein by reference. Although the positioning subsystem shown in FIG. 1 uses magnetic fields, the methods described below may be implemented using any other suitable positioning subsystem, such as systems based on acoustic or ultrasonic measurements.

For ultrasound image generation, the system 20 may employ the catheters disclosed in U.S. Pat. Nos. 6,716,166 and 6,773,402, whose disclosures are herein incorporated by reference, in order to acquire ultrasound images for display in near realtime ultrasound images concurrently with an image or representation of the position of a deployment catheter in the same or different sessions, and in many different combinations. Such catheters have acoustic transducers that are adapted for emitting sound waves, and receiving reflections from echogenic interfaces in the heart. The reflections are then analyzed to construct two-dimensional and three-dimensional images of the heart.

The system 20 comprises an ultrasound driver 39 that drives the ultrasound transducers of the catheter 28 when it functions as an ultrasound imaging catheter. One example of a suitable ultrasound driver that can be used for this purpose is an AN2300™ ultrasound system produced by Analogic Corporation, 8 Centennial Drive, Peabody, Mass. 01960. The ultrasound driver 39 may support different imaging modes such as B-mode, M-mode, CW Doppler and color flow Doppler, as are known in the art.

Optionally, the catheter 28 and another catheter 48 are both incorporated in the system 20 and inserted concurrently into the heart via different vascular approaches. In this example, the catheter 28 functions as a mapping catheter, and the catheter 48 functions as an ultrasound imaging catheter, using an array of acoustic transducers 50. Each has an instance of the location sensor 46 that is used to determine the position and orientation of the catheter within the body.

The system 20 contains electronic circuitry for generation of an electrical activation map, and can be used in conjunction with many specialized mapping catheters. A suitable mapping catheter for use as the catheter 28 is described in commonly assigned U.S. Pat. No. 6,892,091, whose disclosure is herein incorporated by reference. Briefly, the distal end of the mapping catheter includes a distally placed mapping electrode 52 for measuring the electrical properties of the heart tissue. The distal end of the mapping catheter further also includes an array of non-contact electrodes 54 for measuring far field electrical signals in the heart chamber.

The system 20 can include as a subsystem the CARTO™ XP EP Navigation and Ablation System, available from Biosense Webster, Inc., 3333 Diamond Canyon Road, Diamond Bar, Calif. 91765, suitably modified to execute the procedures described hereinbelow.

Typically, the mapping catheter is introduced first, and an electrical activation map generated from its data. Afterward, an ultrasound imaging catheter is introduced. The two catheters may be introduced via the same or different vascular approaches.

In yet another alternative, a hybrid catheter, capable of both data acquisition suitable for electrical activation map generation, and also having ultrasound imaging functions can be used. Such catheters are described, for example, in U.S. Pat. Nos. 6,773,402, 6,788,967, and 6,645,145. Use of such catheters may permit the medical procedure to be shortened. In this alternative, only one catheter need be inserted. In all the alternatives, as explained in further detail below, the electrical activation map is preferably acquired first, and then applied to the ultrasound images to assist in the interpretation of the latter. Suitable image registration techniques for coordinating the two modalities are disclosed in U.S. Pat. No. 6,650,927 and in co-pending application Ser. No. 11/215,435 filed on Aug. 30, 2005, entitled "Segmentation and Registration of Multimodal Images using Physiological Data", both of common assignee herewith, and herein incorporated by reference.

The positioning and image processors may be implemented using a general-purpose computer, which is programmed in software to carry out the functions described herein. The software may be downloaded to the computer in electronic form, over a network, for example, or it may alternatively be supplied to the computer on tangible media, such as CD-ROM. The positioning processor and image processor may be implemented using separate computers or using a single computer, or may be integrated with other computing functions of the system 20. Additionally or alternatively, at least some of the positioning and image processing functions may be performed using dedicated hardware.

Figure 2:
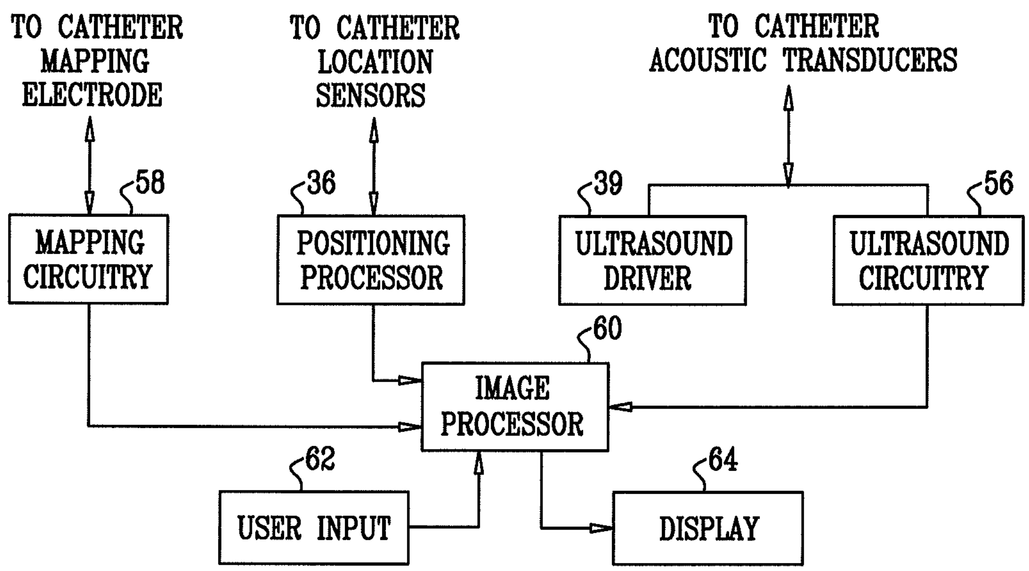
FIG. 2 is a block diagram illustrating further details of the system shown in FIG. 1 in accordance with a disclosed embodiment of the invention.

Reference is now made to FIG. 2, which is a block diagram illustrating further details of the system 20 (FIG. 1). As noted above, many elements of the system 20 can be realized as a general purpose or specialized computer that includes a processor and a memory that contains objects corresponding to the functional blocks depicted in FIG. 2. The positioning processor 36 is linked to location sensors that are placed near the distal tip of the cardiac catheter and performs location tracking.

The ultrasound driver 39, which drives the transducers 50 (FIG. 1) is cooperative with ultrasound circuitry 56, and produces two-dimensional ultrasound images.

As noted above, mapping circuitry 58 for generating an electrical activation map can be realized as the CARTO XP EP Navigation and Ablation System, which receives signals from the mapping electrode 52 (FIG. 1). In some embodiments, the mapping circuitry 58 may be integral with the positioning processor 36.

An image processor 60 is linked to the mapping circuitry 58, the positioning processor 36, and the ultrasound circuitry 56. The image processor 60 performs three-dimensional ultrasound image reconstruction, and is specialized for the automatic identification of cardiac topological features on the ultrasound images. In some embodiments, the image processor 60 may augment automatic identification of topologic features on the electrical activation map by the mapping circuitry 58, without operator assistance. The image processor 60 also performs image registration functions. Its operation is mediated via a user input 62. Its output is sent to a display 64.

Operation

Figure 3:
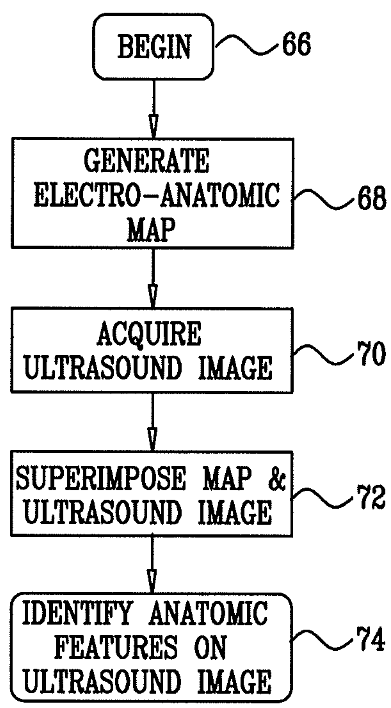
FIG. 3 is a flow chart of a process of extracting and overlaying cardiac electrical activation map information on an ultrasound image of the heart in accordance with a disclosed embodiment of the invention.

Reference is now made to FIG. 3, which is a flow chart of a process of extracting and overlaying cardiac electrical activation map information on an ultrasound image of the heart in accordance with a disclosed embodiment of the invention. In initial step 66, using instrumentation described above with reference to FIG. 1 and FIG. 2, a mapping catheter is introduced into a subject using well-known techniques.

Next, at step 68, the mapping catheter is navigated within the heart, and electrical data obtained. An electrical activation map is generated, for example, using the above-mentioned CARTO XP EP Navigation and Ablation System.

Next, at step 70, the mapping catheter, which was inserted in step 68, is optionally withdrawn. An ultrasound imaging catheter is introduced into the heart and at least one ultrasound image acquired. Position information provided by location sensors on the ultrasound imaging catheter are processed by the positioning subsystem to establish coordinates of different points on the ultrasound image.

Next, at step 72, the ultrasound image is superimposed on the electrical activation map, such that the two are placed in registration. This is carried out automatically, using the above-mentioned registration techniques. Since the ultrasound catheter includes both a location sensor and an ultrasound transducer in one unit. The system, after appropriate calibration, can automatically correlate any point seen on the ultrasound image with its corresponding point in three-dimensional space of the electro-anatomic map (CARTO 3D-space). The image registration is typically established by correlating the coordinates during the generation of the electro-anatomic map with the position information and coordinates on the ultrasound image that were obtained in step 70. As is known from the above-cited patent documents, external anatomic markers may be used to provide a common frame of reference in order to couple the data from the two modalities. In some applications, the ultrasound image is a three-dimensional ultrasound image that is reconstructed from multiple two-dimensional ultrasound images.

Final step 74 is generally performed as a postprocessing step in which cardiac chambers and other anatomic structures features are identified on the ultrasound image. These may be identified and distinguished from one another by visual indicators, e.g., textual indicia, or by the use of graphics, e.g., color differentiation of areas corresponding to different anatomic features, different shadings or texture patterns.

Figure 4:
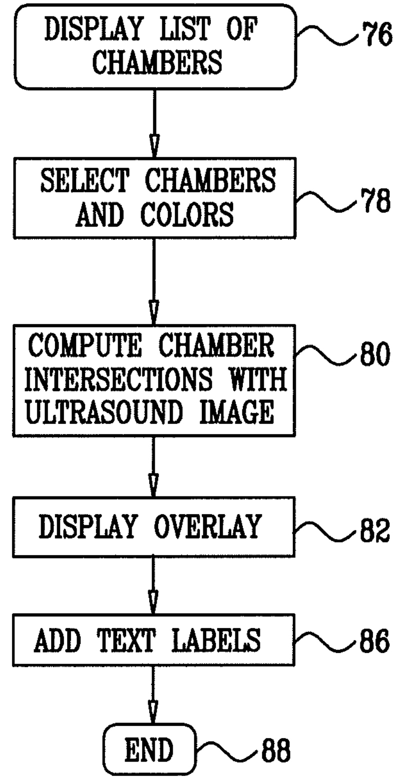
FIG. 4 is a flow chart illustrating a method of identifying anatomic structures on an ultrasound image that is in registration with an electrical activation map, in accordance with a disclosed embodiment of the invention.

Reference is now made to FIG. 4, which is a flow chart illustrating a method of identifying anatomic structures on an ultrasound image, which is in registration with an electrical activation map, in accordance with a disclosed embodiment of the invention. Essentially, FIG. 4 describes the performance of final step 74 (FIG. 3).

At initial step 76, a list of cardiac chambers is presented to the operator, from which he may select any combination of chambers.

Next, at step 78, the operator selects a relevant combination of cardiac chambers from the list, and associates each selected chamber with a distinct graphical identifier, e.g., a color. Alternatively, the graphical identifier may be automatically assigned by the system.

Next, at step 80, a processor computes the intersection of all selected chambers with the ultrasound image. For this step, the ultrasound image is gated at a convenient point in the cardiac cycle.

Figure 5:
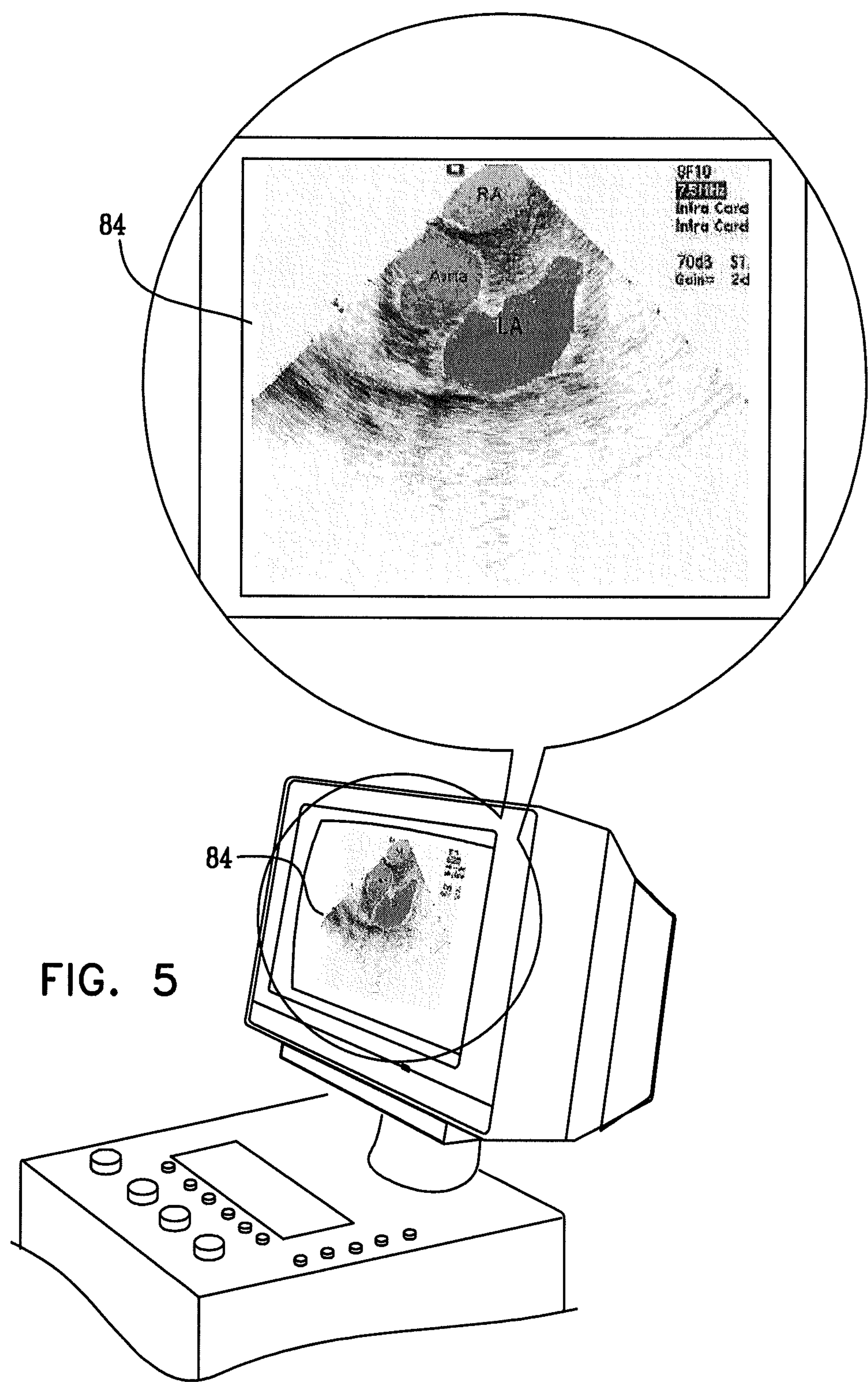
FIG. 5 is an exemplary overlay that was produced using the method shown in FIG. 4, in accordance with a disclosed embodiment of the invention.

Next, at step 82, colors that were selected in step 78 are applied to the intersections computed in step 80. This results in a semi-transparent overlay of the selected color on each region of the ultrasound fan that intersects one of the selected chamber. Reference is now made to FIG. 5, which is an exemplary overlay that was produced in a performance of step 82, in accordance with a disclosed embodiment of the invention. A cardiac ultrasound image is shown as a fan-shaped radiation 84. Superimposed are areas representing the right atrium (RA), left atrium (LA) and the aorta.

Referring again to FIG. 4, in addition to chamber names and color, other information may be overlaid and displayed with the ultrasound image in step 82, including vascular structures such as the aorta, areas of interest noted on the electrical activation map, catheter locations, tags designating candidate areas for ablation, previously ablated areas, and planned ablation lines.

In step 86, which is optional, text labels are applied to identify the chambers and other information on the overlay. This is done automatically. The procedure then terminates at final step 88. The process can be repeated whenever the ultrasound catheter is navigated within the heart and another image acquired, using a common electrical activation map.

Alternative Embodiment

Figure 6:
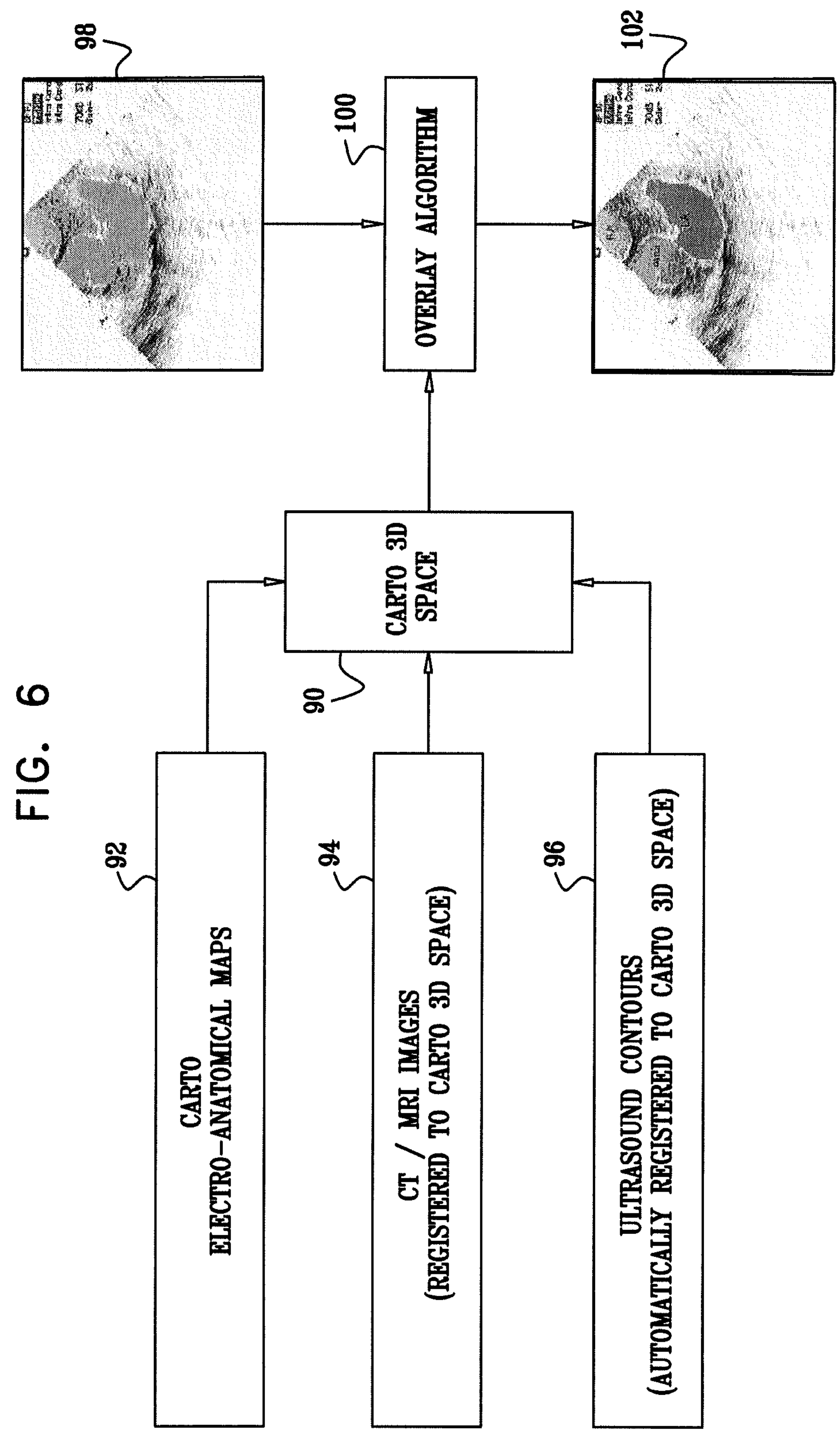
FIG. 6 is a composite pictorial diagram illustrating an arrangement for evaluating ultrasound images of a heart of a patient, in accordance with an alternate embodiment of the invention.

Reference is now made to FIG. 6, which is a pictorial diagram illustrating a system and method for evaluating ultrasound images of a heart of a patient in accordance with an alternate embodiment of the invention. As shown in FIG. 6, different imaging modalities are employed as sources of reference anatomic information, individually, or in various combinations. Common to all of these is the use of a location sensor to define CARTO 3D-space, indicated as block 90, even when electro-anatomic maps are not being generated. One source of reference information may be an electro-anatomic map, indicated in block 92. As described above, when acquiring the electro-anatomic map, the position of the mapping catheter is known at all times from information generated by its location sensor 46 (FIG. 1). Additional or alternative sources of reference anatomic information include a CT image or MRI image, shown in block 94, and a three-dimensional ultrasound image, as shown in block 96, or a combination of these images. Three-dimensional ultrasound images are constructed, using the methods disclosed in the above-noted U.S. Pat. No. 6,773,402. These modalities are listed by way of example, and not of limitation. In some applications other modalities could provide the reference anatomic information, e.g., various nuclear medicine techniques.

The images of blocks 94, 96 may be pre-acquired or concurrently acquired with the data defining the CARTO 3D-space. In either case, the points on the images of blocks 94, 96 are automatically transformed into points in CARTO 3D-space (block 90). A two-dimensional ultrasound image 98, which is to be interpreted by a physician, is registered with the transformed coordinates in CARTO 3D-space, indicated as block 100. This is accomplished using an overlay algorithm, according to one of the above-noted registration methods. After graphical enhancement as described above with respect to FIG. 4, the result is displayed as an enhanced image 102, in which the interpreting physician can relate structures of interest to the automatically identified features.

Figure 7:
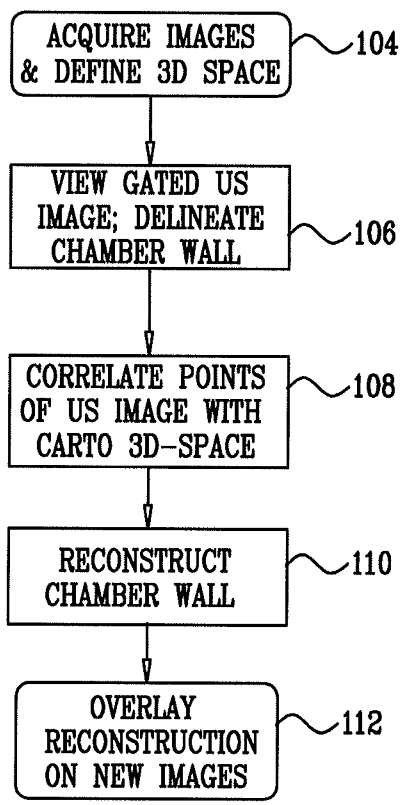
FIG. 7 is a flow chart of a method of imaging a heart of a living subject using the arrangement shown FIG. 6, in accordance with a disclosed embodiment of the invention.

Reference is now made to FIG. 7, which is a flow chart of a method of imaging a heart of a living subject in accordance with a disclosed embodiment of the invention.

At initial step 104, the system and method described above with reference to FIG. 6 is used to acquire at least one reference image of the heart, define a CARTO 3D-space, transform the reference image into the CARTO 3D-space, and acquire a gated 2D-ultrasound image.

Next, at step 106, the operator or physician views the gated 2D-ultrasound image, which typically displays a cross section of a specific heart chamber. The physician annotates that image to delineate the chamber wall.

Next, at step 108, the computer system, e.g. CARTO, which was used to define the CARTO 3D-space, correlates points on the gated ultrasound image with points in the CARTO 3D-space. It will be recalled that the position and orientation of the ultrasound transducer used to define the CARTO 3D-space is known at the exact moment that the gated image was taken. More specifically, the computer system can project the contour that was drawn on the 2D ultrasound image by the physician to a contour in the CARTO 3D space. This 3D-contour, in step 110, can now be used to reconstruct the chamber wall in the CARTO 3D-space. In essence, the CARTO 3D-space serves as a spatial memory of the gated 2d-ultrasound image.

Next, at final step 112, the reconstruction performed in step 108 is overlaid on any number of new reference ultrasound images. In general, any reference image that enters the CARTO 3D-space can be overlaid on the gated 2D-ultrasound image.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A computer-assisted method for producing images of a heart in a living subject, comprising the steps of:

introducing a catheter into the heart, the catheter having an electrical mapping electrode, a position sensor and an ultrasound imaging sensor;

generating an electro-anatomic map from electrical data obtained by the electrical mapping electrode and the position sensor, the electro-anatomic map establishing coordinates of points in a 3D image space, the electro-anatomic map identifying anatomic features of the heart;

acquiring an ultrasound image of the heart from data obtained by the ultrasound imaging sensor;

establishing coordinates of points on the ultrasound image from the data obtained by the position sensor;

automatically registering the electro-anatomic map with the ultrasound image by correlating the points on the ultrasound image with corresponding points in the 3D image space of the electro-anatomic map; and automatically identifying on the ultrasound image the anatomic features identified by the electro-anatomic map by:

(i) displaying a list of cardiac chambers;

(ii) selecting one or more cardiac chambers from the list;

(iii) selecting a distinct graphical identifier for each selected cardiac chamber;

(iv) determining a plurality of intersection points of the selected cardiac chambers with the ultrasound image; and (v) overlaying the selected graphical identifiers at the plurality of intersection points.

2. The method of claim 1 further comprising the step of reconstructing the ultrasound image from a plurality of 2D ultrasound images to form a 3D image.

3. The method of claim 1 further comprising the step of establishing coordinates of different points on the ultrasound image by processing position information provided by the position sensor.

4. The method of claim 1 further comprising the step of gating the ultrasound image at a point in the cardiac cycle for determining the plurality of intersection points of the selected cardiac chambers with the ultrasound image.

* * * * *